United States Patent
Nasu

(10) Patent No.: US 7,330,980 B2
(45) Date of Patent: Feb. 12, 2008

(54) METHOD OF AND SYSTEM FOR ENCRYPTING DIGITAL DATA, METHOD OF AND APPARATUS FOR REPRODUCING DIGITAL DATA, AND COMPUTER PRODUCT

(75) Inventor: Masami Nasu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 792 days.

(21) Appl. No.: 10/134,630

(22) Filed: Apr. 30, 2002

(65) Prior Publication Data

US 2002/0168068 A1   Nov. 14, 2002

(30) Foreign Application Priority Data

May 11, 2001   (JP)   ............................. 2001-142204

(51) Int. Cl.
G06F 21/22   (2006.01)
H04L 9/00   (2006.01)
H04K 1/00   (2006.01)

(52) U.S. Cl. .................. 713/193; 380/28; 726/32; 705/57

(58) Field of Classification Search ................ 713/193
See application file for complete search history.

(56) References Cited

U.S. PATENT DOCUMENTS

| | | | |
|---|---|---|---|
| 5,343,527 A * | 8/1994 | Moore | 713/179 |
| 5,355,413 A * | 10/1994 | Ohno | 713/159 |
| 5,857,025 A * | 1/1999 | Anderson et al. | 380/28 |
| 6,078,665 A * | 6/2000 | Anderson et al. | 380/28 |
| 6,236,727 B1 * | 5/2001 | Ciacelli et al. | 380/212 |
| 6,728,378 B2 * | 4/2004 | Garib | 380/259 |
| 6,981,141 B1 * | 12/2005 | Mahne et al. | 713/165 |
| 2007/0154018 A1 * | 7/2007 | Watanabe | 380/273 |

OTHER PUBLICATIONS

U.S. Appl. No. 10/134,630, filed Apr. 30, 2002, Nasu.
U.S. Appl. No. 10/810,696, filed Mar. 29, 2004, Nasu.

* cited by examiner

Primary Examiner—Christopher Revak
(74) Attorney, Agent, or Firm—Oblon, Spivak, McClelland, Maier & Neustadt, P.C.

(57) ABSTRACT

There is provided an input unit which reads copyright digital data stored in a recording medium such as a CD-ROM, an operation unit which performs encryption of digital data based on an encryption algorithm from a plurality of encryption algorithms. A file unit outputs the digital data encrypted by the operation unit and an index value and the encryption operation equation generation parameter into one file. A reproducing apparatus obtains an encryption operation equation from the index value and the encryption operation equation generation parameter in this same file and reproduces the encrypted digital data.

13 Claims, 6 Drawing Sheets

METHOD OF AND SYSTEM FOR ENCRYPTING DIGITAL DATA, METHOD OF AND APPARATUS FOR REPRODUCING DIGITAL DATA, AND COMPUTER PRODUCT

FIELD OF THE INVENTION

The present invention relates to a technology for reproducing encrypted digital data.

BACKGROUND OF THE INVENTION

In recent years, digital data reproducing apparatuses such as portable music players which employ flash memories and utilize the high compression techniques for digital data have appeared in the market. An example of such an apparatus is the MP3 player which handles music data and utilizes MP3 (MPEG3) technology. Because of the use of the high compression technique, the amount of digital data to be stored in the flash memory is reduced considerably. As a result, reproduction of, for example, music, for a longer time is possible even if the memory capacity is less. Moreover, such digital data reproducing apparatuses are excellent in portability, they consume less power, and are lightweight.

The digital data, e.g., music data reproduced by such a digital data reproducing apparatus is a copyright product. However, since the digital data or music data is small in data capacity, it can be transferred in a short time and can be easily carried by a user while storing the data in a small-sized recording medium such as a flash memory. As a result, the problem which the digital data or music data is illegally distributed and used disadvantageously occurs.

To deal with this problem, various measures have been now proposed to prevent the illegal distribution and the illegal use of copyright digital data. A portable music player which employs a flash memory, for example, is configured to use a flash memory card which has a copyright protection function in advance and, therefore, protects the copyright of digital data by using an authentication system between the flash memory card and the music player. The method of this type has a disadvantage in that the usage conditions of the operating system (OS) of a personal computer which a user uses are given large restrictions.

If the copyright protection method is applied to a digital data reproducing apparatus, such as a portable music player, which reproduces digital data using a flash memory card, the electrical circuit mounted configuration of this portable music player has to be changed, with the result that the development cost thereof is disadvantageously pushed up.

SUMMARY OF THE INVENTION

It is an object of the present invention to provide a method of and a system for encrypting digital data, a method of and an apparatus for reproducing digital data which can protect the copyright of digital data and which can realize this copyright protection without restricting the usage conditions of a personal computer or the like and without adversely influencing the cost of the digital reproducing apparatus. It is also an object of this invention to provide computer programs which when executed on a computer realize the method according to the present invention on the computer.

The digital data encryption system according to one aspect of this invention comprises an operation unit which receives digital data and encrypts the digital data in accordance with a predetermined encryption algorithm and an encryption operation equation determined based on an encryption operation equation generation parameter, and a file unit which generates a file containing the encrypted digital data, an index value capable univocally of determining the encryption algorithm, and the encryption operation equation generation parameter used for encryption of the digital data.

The digital data reproducing apparatus according to another aspect of this invention decodes and reproduces digital data from encrypted digital data generated by a digital data encryption system. The digital data encryption system includes an operation unit which receives digital data and encrypts the digital data in accordance with a predetermined encryption algorithm and an encryption operation equation determined based on an encryption operation equation generation parameter, and a file unit which generates a file containing the encrypted digital data, an index value capable univocally of determining the encryption algorithm, and the encryption operation equation generation parameter used for encryption of the digital data. The digital data reproducing apparatus comprises a read unit which fetches the encrypted digital data from the file; an operation unit which determines an index value of an encryption algorithm and an encryption operation equation based on the encryption operation equation generation parameter in the file, and decodes the encrypted digital data in accordance with the encryption operation equation to obtain decoded digital data; and a reproducing unit which reproduces and the decoded digital data.

The digital data encryption method according to still another aspect of this invention comprises receiving digital data and encrypting the digital data in accordance with a predetermined encryption algorithm and an encryption operation equation determined based on an encryption operation equation generation parameter, and generating a file containing the encrypted digital data, an index value capable univocally of determining the encryption algorithm, and the encryption operation equation generation parameter used for encryption of the digital data.

The digital data reproducing method according to still another aspect of this invention is for decoding and reproducing digital data from encrypted digital data generated by a digital data encryption method. The digital data encryption method includes receiving digital data and encrypting the digital data in accordance with a predetermined encryption algorithm and an encryption operation equation determined based on an encryption operation equation generation parameter, and generating a file containing the encrypted digital data, an index value capable univocally of determining the encryption algorithm, and the encryption operation equation generation parameter used for encryption of the digital data. The digital data reproducing method comprises fetching the encrypted digital data from the file; determining an index value of an encryption algorithm and an encryption operation equation based on the encryption operation equation generation parameter in the file, and decoding the encrypted digital data in accordance with the encryption operation equation to obtain decoded digital data, and reproducing the decoded digital data.

The computer programs according to still another aspect of this invention realize the methods according to the present invention on a computer.

Other objects and features of this invention will become apparent from the following description with reference to the accompanying drawings.

DETAILED DESCRIPTIONS

Embodiments of the method of and system for encrypting digital data, the method of and the apparatus for reproducing digital data, and the computer program according to present invention will be explained hereinafter in detail with reference to the accompanying drawings.

Figure 1:
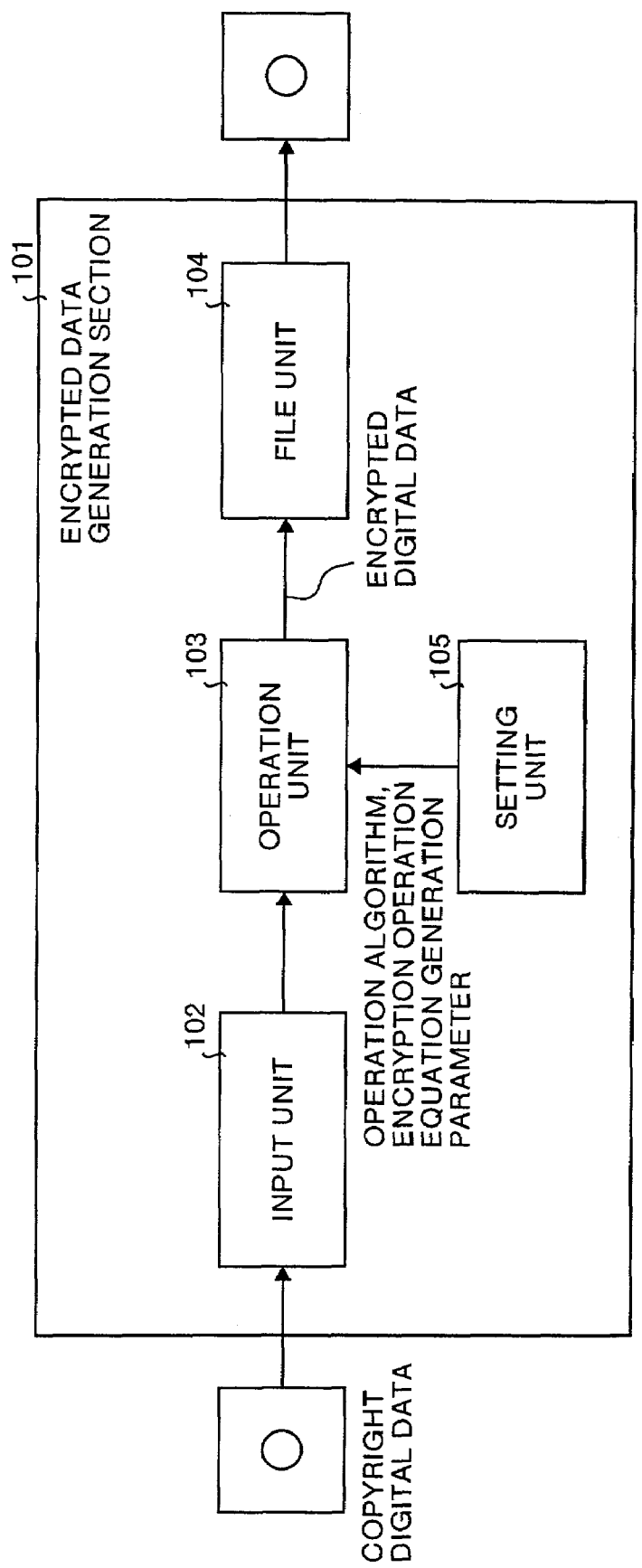
FIG. 1 is a block diagram which shows the configuration of a digital data encryption system in the first embodiment according to the present invention.

FIG. 1 is a block diagram which shows the configuration of an encrypted data generation section which is a main part of a digital data encryption system according to the present invention. In FIG. 1, an encrypted data generation section 101 consists of an input unit 102 which inputs copyright digital data, an operation unit 103 which consist of a CPU or the like, which encrypts the copyright digital data input to the input unit 102, a file unit 104 which consists of a hard disk, a flash memory or the like, which files and outputs the encrypted digital data encrypted by the operation unit 103, and a setting unit 105 which registers and sets an encryption algorithm and an encryption operation equation generation parameter used for the encryption processing of the operation unit 103.

The input unit 102 can be configured out of a driver which reads data from a recording medium such as a hard disk or a CD-ROM. The file unit 104 can be configured out of a driver which writes data to a recording medium such as a hard disk or a flash memory. The setting unit 105 can be configured out of a memory such as a ROM or a RAM. The encrypted data generation section 101 thus configured can executes and controls a program for allowing the operation unit 103 to perform the encryption processing according to procedures to be explained below while using a general purpose computer.

Figure 2:
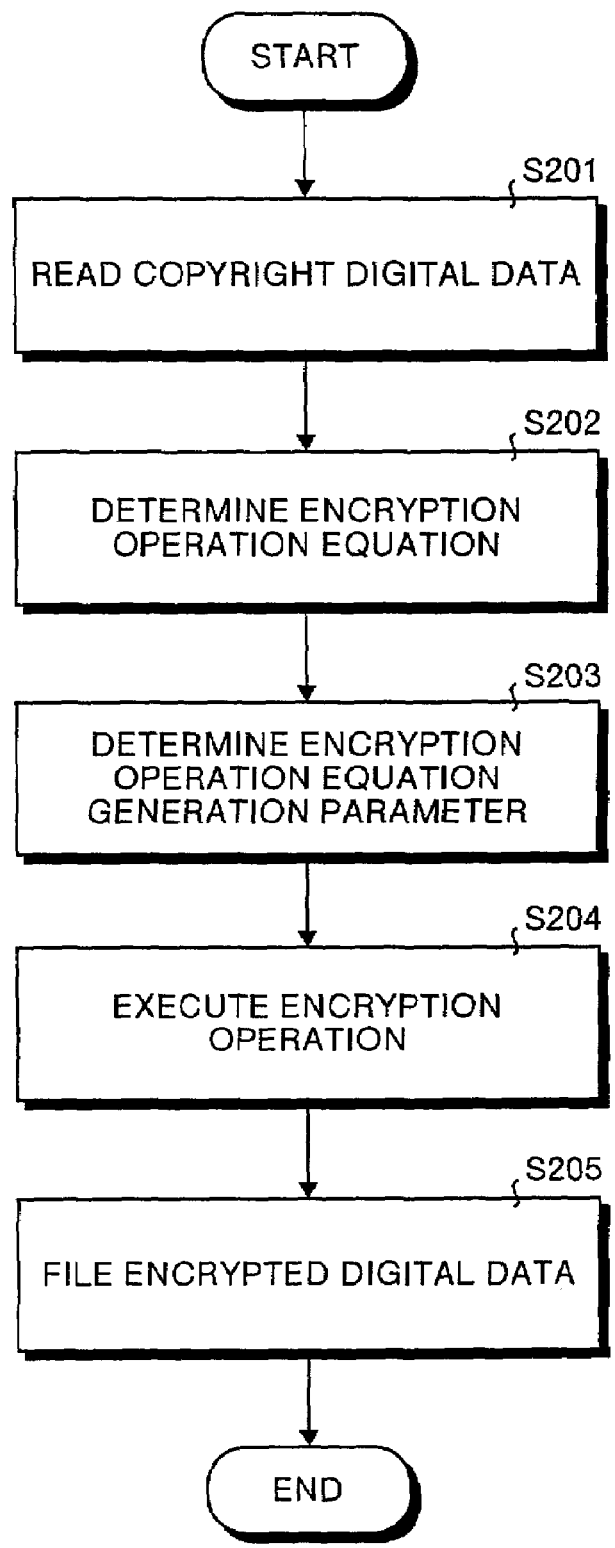
FIG. 2 is a flow chart which shows the encryption processing of the digital data encryption system in the first embodiment.

The copyright digital data encryption procedures of the encrypted data generation section 101 will next be explained with reference to the flow chart shown in FIG. 2. The operation unit 103 reads copyright digital data input via the input unit 102 (at a step S201). An encryption algorithm (encryption operation equation) used for actual encryption is determined (selected) (at a step S202).

The setting unit 105 registers and sets a plurality of encryption algorithms in advance. The operation unit 103 selects one of the encryption algorithms. Specifically, the encryption algorithm is automatically selected by the operation unit 103 according to user's operation and selection.

The operation unit 103 then determines an encryption operation equation generation parameter used for the selected encryption algorithm (at a step S203) This encryption operation equation generation parameter is automatically set by the operation unit 103. An encryption operation equation f(x) for an actual encryption processing is determined according to the encryption algorithm and the setting of the encryption operation equation generation parameter. A determination method for the encryption operation equation f(x) is included in the selected encryption algorithm.

The operation unit 103 executes an encryption processing to the copyright digital data using the encryption operation equation f(x) (at a step S204). The concrete example of the encryption processing will be explained. The copyright digital data to be encrypted is regarded as a set of certain integers (X1, X2, X3 . . . ). The determination of the type of the set of integers is based on the procedures shown by the encryption algorithm. For example, the copyright digital data to be encrypted is regarded as a set of integers and these integers are subjected to the following arithmetic operation in accordance with the encryption operation equation f(x), $Y1 = f(X1),$ $Y2 = f(X2),$ $Y3 = f(X3),$ $Yn = f(Xn).$ A set of integers (Y1, Y2, Y3, . . . , Yn) after the arithmetic operation is generated as encrypted digital data.

The file unit 104 files the index value of the encryption algorithm which is used to generate the encrypted data and the encryption operation equation generation parameter as well as the operated, encrypted digital data (Y1, Y2, Y3, . . . , Yn) in the same file (at a step S205). The filed, encrypted digital data is written to and stored in a storage medium such as a flash memory.

To reproduce this encrypted digital data as will be explained later, the index value of the encryption algorithm described at a predetermined location of the file is read and a location, in which the encryption operation equation generation parameter determined according to the index value of this encryption algorithm is described, is referred to. Information necessary for decoding is acquired, a decoding operation equation is generated, a decoding processing is performed based on the decoding operation equation and the encrypted digital data is thereby reproduced.

The encrypted digital data generated by the encryption operation is converted from original copyright digital data to data in a format which is normally meaningless. It is, therefore, impossible to reproduce this encrypted digital data unless a decoder which is paired with the encrypted data generation section and which performs a specific decoding operation is used. This encrypted digital data cannot be reproduced and used in a general environment. Therefore, even if the data is illegally distributed, it is possible to prevent the illegal use of the data.

During encryption, in particular, a combination of one encryption algorithm and one encryption operation equation generation parameter is selected from among a plurality of encryption algorithms and a plurality of encryption operation equation generation parameters. It is, therefore, possible to complicate an encryption rule and to decrease the probability of the decryption of the encrypted digital data.

The operation unit 103 may be configured so that the unencrypted copyright digital data and the encrypted digital data are output and written to the original storage medium (the input unit 102 or the file unit 104).

Figure 3:
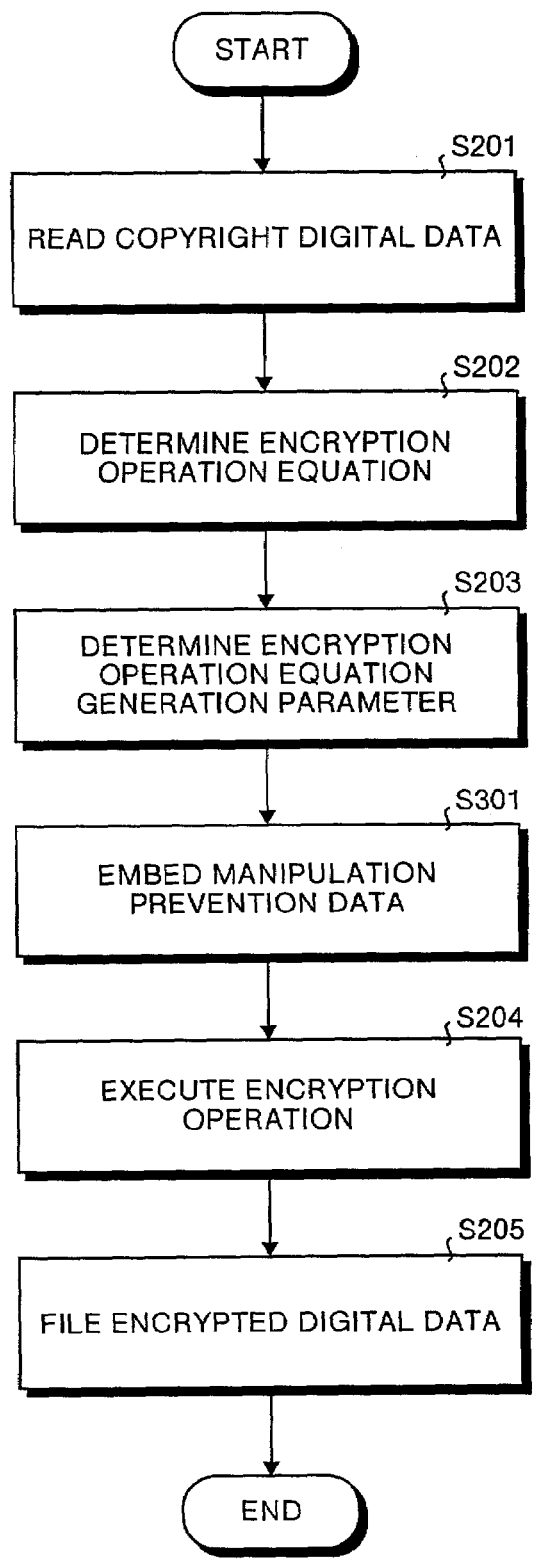
FIG. 3 is a flow chart which shows another encryption processing of the digital data encryption system in the second embodiment according to the present invention.

FIG. 3 is a flow chart which shows copyright digital data encryption procedures in the second embodiment according to the present invention. The same processings shown in FIG. 2 as those explained in the first embodiment (shown in FIG. 2) are denoted by the same reference symbols and will not be explained herein.

In the second embodiment, the operation unit 103 executes a processing of embedding manipulation prevention data (data manipulation detection codes) (at a step S301) before executing the encryption operation (at the step S204). Specifically, a specific data manipulation detection code is embedded in an arbitrary location of copyright digital data to be encrypted. The location in which the data manipulation detection codes are embedded, the number of codes and the content of the code are determined by the encryption algorithm selected at the step S202.

The copyright digital data into which this data manipulation detection code is embedded is subjected to an encryption operation at a step S204. To determine whether or not the copyright digital data is not manipulated, this encrypted digital data is decoded, the data manipulation detection code embedded in the digital data is detected. If the specific location in which the data manipulation detection code is embedded, the number of codes and the contents of codes are completely consistent with those of the digital data before the encryption operation, it is determined that the digital data is not manipulated. If some of the specific location in which the data manipulation detection code is embedded, the number of codes and the contents of codes are inconsistent with those of the digital data before the encryption operation, it is determined that the digital data is manipulated.

The digital data encryption system explained in this embodiment is configured so that information (the index value of the encryption algorithm and the encryption operation equation generation parameter) for determining the encryption operation equation and the encrypted digital data are formed into one file. Alternatively, the digital data encryption system may be configured so that this encryption operation equation determining information (the index value of the encryption algorithm and the encryption operation equation generation parameter) is changed to predetermined data to make it impossible to easily specify the locations (e.g., areas), in which the encryption operation equation determining information is described, in the file from the outside of the system.

For example, information for determining the actual encryption operation equation and unnecessary information (e.g., a meaningless data string such as random numbers) other than the encryption operation equation determining information are described in the same file. If so, data for indicating the unnecessary information (e.g., areas described by the unnecessary information) is added to the encryption operation equation determining information. When the encrypted digital data is decoded, the unnecessary information other than the encryption operation equation determining information is deleted based on the encryption operation equation determining information.

An embodiment of a digital data reproducing apparatus according to the present invention will be explained as the third embodiment. This digital data reproducing apparatus decodes encrypted digital data as explained in the preceding embodiments and reproduces copyright digital data. The encrypted digital data is filed by the file unit 104 of the encrypted data generation section 101 and written to and recorded in a detachable recording medium, such as a flash memory. By attaching this recording medium to the read unit of the reproducing apparatus, this encrypted digital data can be reproduced.

Figure 4:
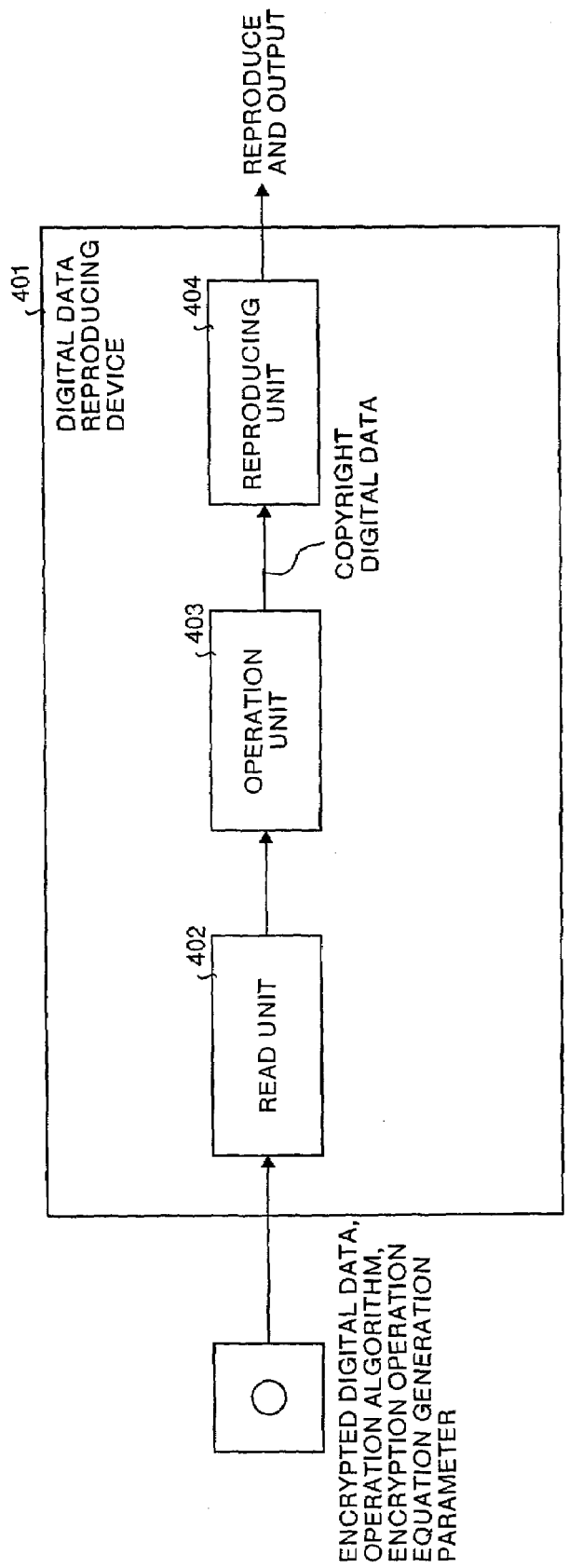
FIG. 4 is a block diagram which shows the configuration of a digital data reproducing apparatus in the third embodiment according to the present invention.

FIG. 4 is a block diagram which shows the configuration of the digital data reproducing apparatus according to the present invention. A digital data reproducing apparatus 401 consists of a read unit 402 which reads data from a recording medium which records the encrypted digital data, an operation unit 403 which consists of a CPU or the like and which decodes the encrypted digital data read from the recording medium by the read unit 402 to original copyright digital data, and a reproducing unit 404 which reproduces the original copyright digital data obtained by the decoding processing of the operation unit 403.

Figure 5:
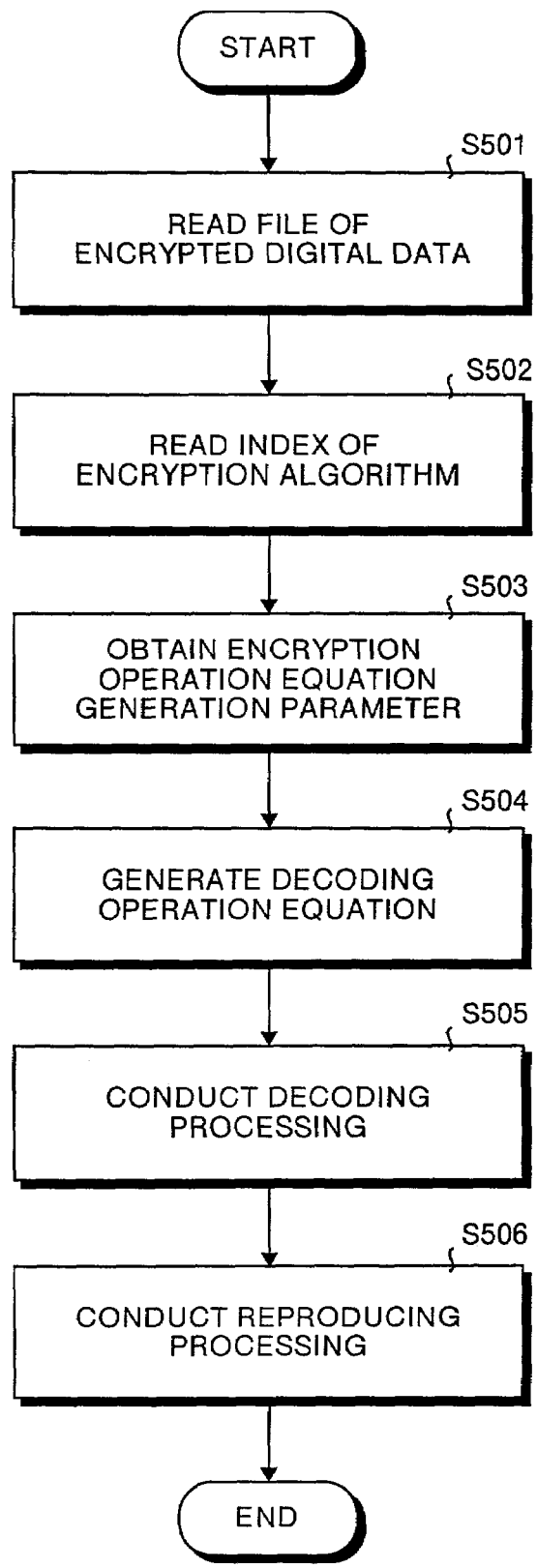
FIG. 5 is a flow chart which shows the decoding processing of the digital data reproducing apparatus in the third embodiment.

FIG. 5 is a flow chart which shows the digital data reproducing procedures of the digital data reproducing apparatus according to the present invention. The read unit 402 of the digital data reproducing apparatus 401 reads the file recorded on the recording medium (at a step S501). The read unit 402 then reads the index value of an encryption algorithm described in the predetermined location of the file (at a step S502). An encryption operation equation generation parameter is obtained by referring to the location in which the encryption operation equation generation parameter is described and which is determined by the index value of the encryption algorithm thus read (at a step S503) As a result, information necessary for the decoding of the encrypted digital data can be acquired.

Based on the information (the index value of the encryption algorithm and the encryption operation equation generation parameter), a decoding operation equation is generated (at a step S504). Thereafter, encrypted digital data stored in the same file as that of the acquired information is decoded based on the decoding operation equation (at a step S505). As a result, the copyright digital data before being subjected to an encryption processing can be decoded and reproduced by the reproducing unit 404 in accordance with the data format of the copyright digital data (at a step S506).

Figure 6:
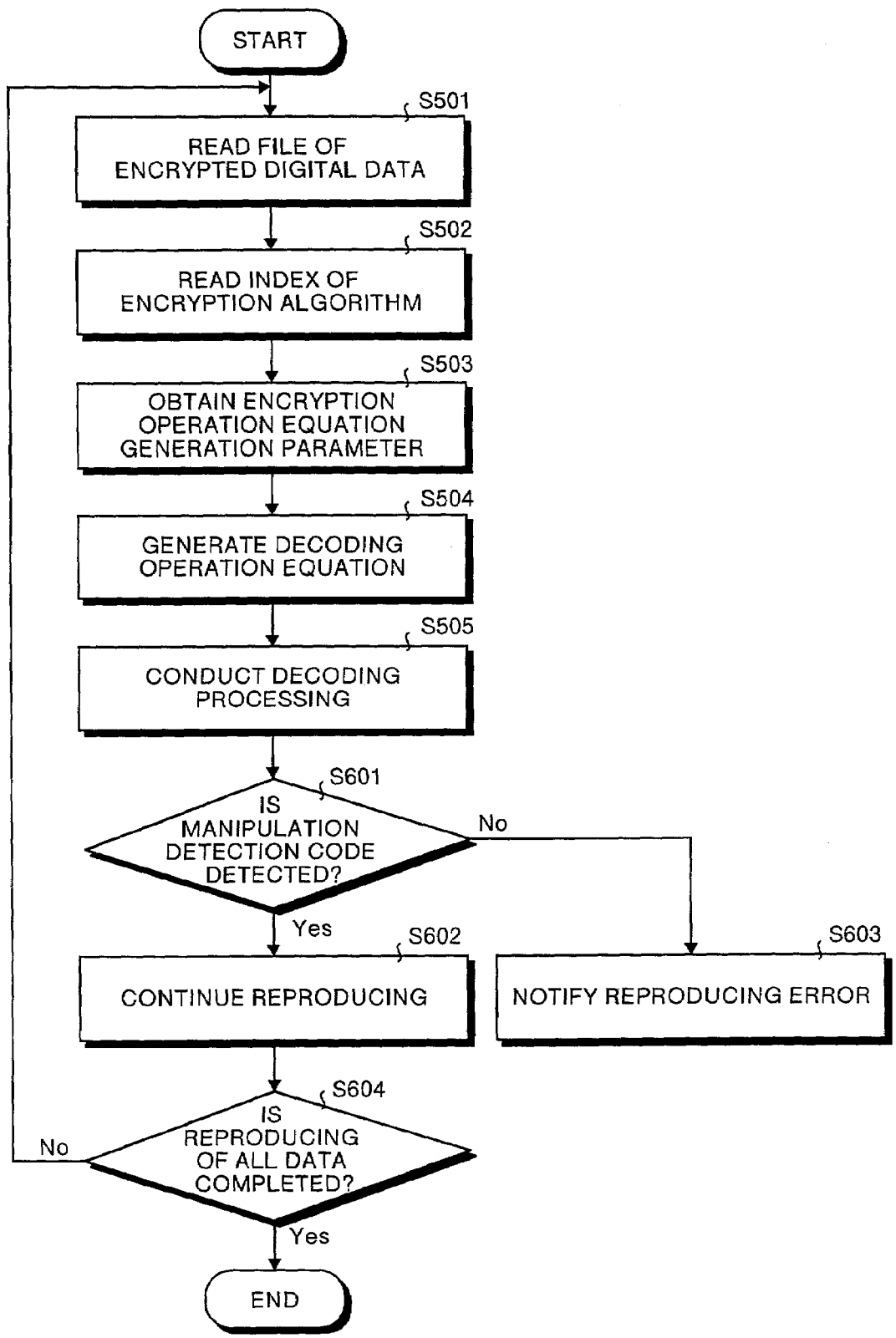
FIG. 6 is a flow chart which shows another decoding processing of the digital data reproducing apparatus in the fourth embodiment according to the present invention.

FIG. 6 is a flow chart which shows encrypted digital data decoding procedures in the fourth embodiment according to the present invention. The same processings shown in FIG. 6 as those explained in the third embodiment (shown in FIG. 5) are denoted by the same reference symbols and will not be explained herein.

In the fourth embodiment, procedures of determining whether or not data is manipulated during the decoding processing are added to the procedures of the operation unit 403. A specific data manipulation code is embedded in an arbitrary location of the encrypted digital data. If this data manipulation code is detected (at a step S601, Yes) after the decoding processing at the step S505, it is determined that the data is not manipulated and can be reproduced and data reproducing is continued (at a step S602) If the data manipulation code is not detected (at the step S601, No), it is determined that there is a probability that the data is manipulated or at least there is a data reproducing error and data reproducing is stopped (at a step S603).

The concrete example of the detection of the data manipulation detection code is as follows. If the specific embedding location, the number of codes and the contents of the code are completely consistent with those of the encrypted digital data, it is determined that the data is not manipulated. If some of them are not consistent, it is determined that the data is manipulated.

In the flowchart shown in FIG. 6, the copyright digital data to be decoded shows an example of digital data, such as music data, for requiring predetermined reproducing time.

Before the encrypted digital data in such a data format is entirely reproduced (at a step S604, No), the read unit 402 returns to the step S501 and continuously reads the encrypted digital while sequentially performing the decoding processing at the step S505 and the data manipulation detection, and completes with the reproducing of the entire encrypted digital data (at a step S604, Yes).

The present invention does not adopt an advanced copyright protection configuration specific to the delivery of music. Instead, the present invention adopts a configuration in which copyright digital data generated for a digital data reproducing apparatus is protected by performing an encryption processing so that the copyright digital data cannot be reproduced if the data is illegally distributed. The present invention can, therefore, realize the digital data protection without influencing, in particular, user's usage environment and development cost.

The respective configuration elements of the digital data encryption system are configured so that encrypted digital data is generated using an arbitrary encryption operation equation during the encryption processing for copyright digital data and that the index value of the encryption algorithm and the encryption operation equation generation parameter used for the encryption operation are stored in the same file as the file which stores the encrypted digital data. It is, therefore, possible to easily encrypt the copyright digital data using a general purpose computer apparatus without giving any restriction to the OS or the like of the computer apparatus.

Furthermore, the respective configuration elements of the digital data reproducing apparatus according to the present invention can be applied to those of a digital data reproducing apparatus such as a music player which employs a semiconductor memory such as a flash memory or a digital camera which has a music reproducing function. In addition, the digital data reproducing apparatus can protect the copyright of the digital data reproduced by the reproducing apparatus. Further, the digital data reproducing apparatus can execute an arithmetic operation of decoding based on the index value of the encryption algorithm and the encryption operation equation generation parameter which are included in the encrypted digital data. It is, therefore, possible to realize the protection of the copyright of the digital data while suppressing apparatus cost without using a special configuration element dedicated to the decoding.

In the above-explained embodiments, the configuration for storing the encrypted digital data in the recording medium such as a flash memory and reproducing, has been explained by way of example. However, the present invention is not limited to this configuration. As a configuration for transferring the encrypted digital data generated in a computer apparatus to a digital data reproducing apparatus, a configuration for transmitting between the computer apparatus and the digital data reproducing apparatus by connecting these apparatuses using a connector or a cable in a predetermined data format or a configuration for transmitting via a network such as the Internet, can be provided. With this configuration, it is possible to obtain the same functions and advantages as those explained in the embodiments.

The digital data encryption method explained in the embodiments can be realized by allowing a general purpose computer to execute an encryption program prepared in advance. This program is recorded in a computer readable recording medium such as a hard disk, a floppy disc, a CD-ROM, an MO or a DVD. The computer reads the program from the recording medium and thereby executes the program. Alternatively, this program can be distributed via the recording medium and a network such as the Internet. Further, the decoding of encrypted digital data can be realized by not only applying the present invention to the digital data reproducing apparatus but also allowing a general purpose computer apparatus to execute a decoding program.

As explained so far, according to one aspect of the present invention, it is advantageously possible to prevent the illegal distribution of the data and to protect the copyright of the digital data. In addition, since the encryption algorithm and the encryption operation equation generation parameter used for encryption are described in the same file, it is advantageously possible to simplify a decoding configuration of facilitating decoding. In addition, it is advantageously possible to realize this copyright protection without giving restrictions to use conditions of a personal computer or the like.

Moreover, since the encryption algorithm actually used for the encryption can be selected from a plurality of encryption algorithms, it is advantageously possible to complicate an encryption rule and to decrease the probability of the decryption of the encrypted digital data.

Furthermore, since the encryption algorithm actually used for the encryption can be selected from a plurality of encryption algorithms, it is advantageously possible to further complicate the encryption rule and to further decrease the probability of the decryption of the encrypted digital data by changing the encryption algorithm and the encryption operation equation generations parameter if a plurality of pieces digital data are to be encrypted.

Moreover, it is advantageously possible to detect whether or not the encrypted digital data is manipulated and to determine whether the digital data is normal digital data or illegally manipulated digital data.

Furthermore, it is advantageously possible to conceal the index value of the encryption algorithm and the encryption operation parameter described in the same file as that of the encrypted digital data and to prevent the encryption operation equation from being illegally decoded.

According to another aspect of the present invention, the digital data formed and encrypted so as to be reproduced in the reproducing apparatus can be advantageously decoded using the index value of the encryption algorithm and the encryption operation equation based on the encryption operation equation generation parameter provided in the same file, and the digital data can be advantageously reproduced only by the decoding processing paired with the encryption processing. If the data thus formed is illegally distributed, it is advantageously possible to prohibit the digital data from being reproduced in this reproducing apparatus, the personal computer or the like and to thereby protect the copyright of the digital data. In addition, it is advantageously possible to realize this copyright protection without influencing the cost of the digital data reproducing apparatus.

Moreover, it is advantageously possible to detect the illegal manipulation of the digital data depending on whether or not the data manipulation detection code embedded in the encrypted digital data is detected. In this instance, since the digital data is not reproduced, it is advantageously possible to prohibit the digital data from being reproduced by illegal decoding and to thereby protect the copyright of the digital data.

According to still another aspect of the present invention, it is advantageously possible to encrypt digital data such as copyright digital data according to simple procedures, to prevent the illegal distribution of the data and to protect the copyright of the digital data. In addition, since the encryption algorithm and the encryption operation equation generation parameter used for encryption are described in the same file, it is advantageously possible to easily conduct decoding.

Moreover, it is advantageously possible to further complicate an encryption rule and to further decrease the probability of the decryption of the encrypted digital data by changing the encryption algorithm and the encryption operation equation generations parameter if a plurality of pieces digital data are to be encrypted.

Furthermore, it is advantageously possible to detect whether or not the encrypted digital data is manipulated and to determine whether the digital data is normal digital data or illegally manipulated digital data.

Moreover, it is advantageously possible to conceal the index value of the encryption algorithm and the encryption operation parameter described in the same file as that of the encrypted digital data and to prevent the encryption operation equation from being illegally decoded.

According to still another aspect of the present invention, it is advantageously possible to decode the digital data formed and encrypted so as to be reproduced in the reproducing apparatus using the index value of the encryption algorithm and the encryption operation equation based on the encryption operation equation generation parameter provided in the same file, and to reproduce the digital data only by the decoding processing paired with the encryption processing. In addition, if the data thus formed is illegally distributed, it is advantageously possible to prohibit the digital data from being reproduced in this reproducing apparatus, the personal computer or the like and to thereby protect the copyright of the digital data.

Moreover, it is advantageously possible to detect the illegal manipulation of the digital data depending on whether or not the data manipulation detection code embedded in the encrypted digital data is detected. In this instance, since the digital data is not reproduced, it is advantageously possible to prohibit the digital data from being reproduced by illegal decoding and to thereby protect the copyright of the digital data.

According to still another aspect of the present invention, it is advantageously possible to execute the digital data encryption processing and decoding and reproducing processing using a computer.

The present document incorporates by reference the entire contents of Japanese priority document, 2001-142204 filed in Japan on May 11, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital data encryption system comprising:
an operation unit which receives digital data and encrypts the digital data in accordance with a predetermined encryption algorithm and an encryption operation equation determined based on an encryption operation equation generation parameter; and
a file unit which generates a file by combining the digital data encrypted by the operation unit with an index value capable univocally of determining the encryption algorithm and the encryption operation equation generation parameter used for encryption of the digital data,
wherein the operation unit is configured to embed a data manipulation detection code in at least one of various locations in the digital data based on the predetermined encryption algorithm prior to the encryption of the digital data, in order to enable the detection of an illegal manipulation of the digital data.

2. The digital data encryption system according to claim 1, further comprising a setting unit which registers a plurality of encryption algorithms; and selecting unit which selects an encryption algorithm registered in the setting unit as the predetermined encryption algorithm,
wherein the operation unit encrypts the digital data based on the predetermined encryption algorithm.

3. The digital data encryption system according to claim 1, wherein
the operation unit selects the encryption algorithm and the encryption operation equation generation parameter used for actual encryption from a plurality of encryption algorithms and a plurality of encryption operation equation generation parameters prepared in advance, respectively, and conducts the encryption processing using the selected encryption algorithm and the selected encryption operation equation generation parameter.

4. The digital data encryption system according to claim 1, wherein
the file unit is configured to combine a meaningless data string with the index value of the encryption algorithm and the encryption operation equation generation parameter within the file which includes the encrypted digital data.

5. A digital data reproducing apparatus which decodes and reproduces copyright digital data from encrypted digital data generated by a digital data encryption system, the digital data encryption system including
an operation unit of the encryption system which receives digital data and encrypts the digital data in accordance with a predetermined encryption algorithm and an encryption operation equation determined based on an encryption operation equation generation parameter,
wherein the operation unit is configured to embed a data manipulation detection code in at least one of various locations in the digital data based on the predetermined encryption algorithm prior to the encryption of the digital data, in order to enable the detection of an illegal manipulation of the digital data; and
a file unit which generates a file by combining the digital data encrypted by the operation unit with an index value capable univocally of determining the encryption algorithm and the encryption operation equation generation parameter used for encryption of the digital data,
the digital data reproducing apparatus comprising:
a read unit which fetches the encrypted digital data from the file;
an operation unit of the reproducing apparatus which determines an index value of an encryption algorithm and an encryption operation equation based on the encryption operation equation generation parameter in the file, and decodes the encrypted digital data in accordance with the encryption operation equation to obtain decoded digital data; and
a reproducing unit which reproduces and the decoded digital data.

6. The digital data reproducing apparatus according to claim 5, wherein the operation unit determines whether the encrypted digital data is manipulated based on whether a specific data manipulation detection code embedded in the digital data prior to encryption is detected in a location corresponding to the index value of the encryption algorithm and if the operation unit determines that the encrypted digital data is manipulated, the encrypted digital data is not reproduced.

7. A digital data encryption method comprising:

receiving digital data and encrypting the digital data in accordance with a predetermined encryption algorithm and an encryption operation equation determined based on an encryption operation equation generation parameter; and generating a file by combining the digital data encrypted by the operation unit with an index value capable univocally of determining the encryption algorithm and the encryption operation equation generation parameter used for encryption of the digital data, wherein the encryption of digital data includes embedding a data manipulation detection code in at least one of various locations in the digital data based on the predetermined encryption algorithm prior to the encryption of the digital data, in order to enable the detection of an illegal manipulation of the digital data.

8. The digital data encryption method according to claim 7, wherein at the encryption of digital data, the encryption algorithm and the encryption operation equation generation parameter used for actual encryption are selected from a plurality of encryption algorithms and a plurality of encryption operation equation generation parameters prepared in advance, respectively, and the encryption of the digital data is conducted using the selected encryption algorithm and the selected encryption operation equation generation parameter.

9. The digital data encryption method according to claim 7, wherein the encryption of digital data includes combining a meaningless data string with the index value of the encryption algorithm and the encryption operation equation generation parameter within the file which includes the encrypted digital data.

10. A digital data reproducing method for decoding and reproducing copyright digital data from encrypted digital data generated by a digital data encryption method, the digital data encryption method including receiving digital data and encrypting the digital data in accordance with a predetermined encryption algorithm and an encryption operation equation determined based on an encryption operation equation generation parameter, wherein the encryption of digital data includes embedding a data manipulation detection code in at least one of various locations in the digital data based on the predetermined encryption algorithm prior to the encryption of the digital data, in order to enable the detection of an illegal manipulation of the digital data; and generating a file by combining the digital data encrypted by the operation unit with an index value capable univocally of determining the encryption algorithm and the encryption operation equation generation parameter used for encryption of the digital data, the digital data reproducing method comprising:
fetching the encrypted digital data from the file;
determining an index value of an encryption algorithm and an encryption operation equation based on the encryption operation equation generation parameter in the file, and decoding the encrypted digital data in accordance with the encryption operation equation to obtain decoded digital data; and
reproducing the decoded digital data.

11. The digital data reproducing method according to claim 10, wherein at the determining the index value, it is determined whether the encrypted digital data is manipulated based on whether a specific data manipulation detection code embedded in the digital data prior to encryption is detected in a location corresponding to the index value, and if it is determined that the encrypted digital data is manipulated, the encrypted digital data is not reproduced.

12. A computer readable medium for storing instructions, which when executed on a computer, causes the computer to realize a digital data encryption method including receiving digital data;
encrypting the digital data in accordance with a predetermined encryption algorithm and an encryption operation equation determined based on an encryption operation equation generation parameter; and
generating a file by combining the digital data encrypted by the operation unit with an index value capable univocally of determining the encryption algorithm and the encryption operation equation generation parameter used for encryption of the digital data,
wherein the encryption of digital data includes embedding a data manipulation detection code in at least one of various locations in the digital data based on the predetermined encryption algorithm prior to the encryption of the digital data, in order to enable the detection of an illegal manipulation of the digital data.

13. A computer readable medium for storing instructions, which when executed on a computer, causes the computer to realize a digital data encryption method and a digital data reproducing method, the digital data encryption method including
receiving digital data;
encrypting the digital data in accordance with a predetermined encryption algorithm and an encryption operation equation determined based on an encryption operation equation generation parameter;
generating a file by combining the digital data encrypted by the operation unit with an index value capable univocally of determining the encryption algorithm and the encryption operation equation generation parameter used for encryption of the digital data,
the digital data reproducing method including fetching the encrypted digital data from the file;
determining an index value of an encryption algorithm and an encryption operation equation based on the encryption operation equation generation parameter in the file, and decoding the encrypted digital data in accordance with the encryption operation equation to obtain decoded digital data; and
reproducing the decoded digital data,
wherein the encryption of digital data includes embedding a data manipulation detection code in at least one of various locations in the digital data based on the predetermined encryption algorithm prior to the encryption of the digital data, in order to enable the detection of an illegal manipulation of the digital data.

* * * * *